United States Patent
Wang et al.

(10) Patent No.: US 6,327,629 B1
(45) Date of Patent: *Dec. 4, 2001

(54) STORED PROCEDURE UNIVERSAL CALLING INTERFACE

(75) Inventors: I-Shin Andy Wang; Kehsing J. Chou, both of San Jose; Frederick Thomas Sharp, Menlo Park; Jy-Jine James Lin, Cupertino, all of CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/656,440

(22) Filed: May 31, 1996

(51) Int. Cl.⁷ .................................................. G06F 9/54
(52) U.S. Cl. ................................. 709/313; 707/2
(58) Field of Search ....................... 707/1–104; 395/702, 395/705, 500.23; 709/310–323; 717/7

(56) References Cited

U.S. PATENT DOCUMENTS

| | | | |
|---|---|---|---|
| 4,992,971 | * | 2/1991 | Hayashi ................................ 717/7 |
| 5,295,256 | * | 3/1994 | Bapat ................................ 395/705 |
| 5,469,574 | * | 11/1995 | Chang et al. ...................... 395/702 |
| 5,566,330 | * | 10/1996 | Sheffield ............................. 707/4 |
| 5,572,673 | * | 11/1996 | Shurts ................................ 713/200 |
| 5,694,595 | * | 12/1997 | Jacobs et al. ........................ 707/9 |
| 5,724,556 | * | 3/1998 | Souder et al. .................. 395/500.23 |
| 6,112,199 | * | 8/2000 | Nelson ................................ 707/4 |

OTHER PUBLICATIONS

IBM Technical Disclosure Bulletin vol. 18, No. 5 pp. 1552–1553, Oct. 1975.*
Mullins, Craig; "What is a stored procedure", Enterprise Syste,s Journal, v9, n12, p67(4), Dec. 1994.*
Edelstein, Herb, Using stored procedures and triggers, DBMS, v5, n10, p66(5), Sep. 1992.*
Kelly C. Bourne, "Putting Rigor Back in RAD", Database Programming and Design, p. 1–8, Aug. 1994.*
Marjorie Thorne, "Products", DBMS, p. 1, Jan. 1995.*
Jurgen Annevelink, "Database Programming Languages: A Functional Approach", ACM, p. 318–327, 1991.*
Shan, "Objects on the Server: A Natural Evolution", Object Magazine May 1995.*
Rhodas, "Ease Into Client/Server With DB2 Stored Procedures", Enterprise Systems Journal v11,n8 p. 38(4), 1996.*
Xoomes, "ODBMS Myths & Realities", JOOP, 1994.*

* cited by examiner

Primary Examiner—St. John Courtenay, III
(74) Attorney, Agent, or Firm—Gates & Cooper LLP

(57) ABSTRACT

A method, apparatus and article of manufacture for a universal calling interface for executing a stored procedure in a computer. Parameter information is retrieved from a database catalog and the computer performs type checking against the user-entered parameters. If there is not a type mismatch then the computer executes the stored procedure without the user entering information about the parameters such as address and type.

9 Claims, 3 Drawing Sheets

STORED PROCEDURE UNIVERSAL CALLING INTERFACE

BACKGROUND OF THE INVENTION

1. Field of the Invention

The present invention relates generally to a universal calling interface for invoking stored procedures on a server, and in particular, to a method for executing stored procedures that eliminates the requirement for identifying the parameters or their types prior to invoking the stored procedure.

2. Description of the Related Art

Stored procedures are collections of pre-defined procedural code that typically employ SQL to access databases. There are a number of benefits in using stored procedures, including function encapsulation, performance enhancement, client-server processing, and security. Stored procedures are not unlike procedures found in other high level languages, in that input and output parameters can be passed to stored procedures. Generally, stored procedures may take any number of parameters, which are defined internally within the procedure.

For example, following is an example of an SQL stored procedure:

CREATE PROCEDURE PROC
       @PARAM1 INTEGER
       @PARAM2 LONG
       @PARAM3 STRING
    SELECT ROW FROM TABLE WHERE
       (A=PARAM1 AND
       B=PARAM2 AND
       C=PARAM3)

In the above example, the stored procedure is named "PROC" and is passed three parameters, "PARAM1", "PARAM2", and "PARAM3" are of type integer, long, and string, respectively.

Generally, a user explicitly invokes stored procedures in an interactive environment, but such procedures can also be invoked by other programs. For example, a stored procedure may be called from a VisualBasic application or interpreter, or an Open DataBase Connectivity (ODBC) application, or any number of other environments. In these prior art methods, the parameters for the stored procedure are defined or described prior to the call For example, the following is an example of a VisualBasic program using ODBC/CLI to invoke a stored procedure:

```
Sub main ( )
Dim henv As Long            ' Environment handle
Dim hdbc As Long            ' Database connection handle
Dim hstmt As Long           ' Statement handle
Dim rc As Integer           ' Return codes
Dim stmt As String
Dim plen(1) As Long
Dim Tab_Name As String
stmt = "CALL inpsrv(?)"
Tab_Name = "PRESIDENT"
   rc =   SQLAllocEnv(henv)
   rc =   SQLAllocConnect(henv, hdbc)
   rc =   SQLSetConnectOption(hdbc, SQL_AUTOCOMMIT,
          SQL_AUTOCOMMIT_OFF)
   rc =   SQLConnect(hdbc, "sample", Len("sample"),
          "userid", Len("userid"), "password",
          Len("password"))
   rc =   SQLAllocStmt(hdbc, hstmt)
   rc =   SQLPrepare(hstmt, stmt, Len(stmt))
```

-continued

```
   plen(0) = Len(Tab_Name)
   rc =   SQLBindParameter(hstmt, 1, SQL_PARAM_INPUT,
          SQL_BASIC_STRING, SQL_CHAR, Len(Tab_Name), 0,
          ByVal Tab_Name, Len(Tab_Name))
   rc =   SQLExecute(hstmt)
   rc =   SQLFreeStmt(hstmt, SQL_DROP)
   rc =   SQLTransact(henv, hdbc, SQL_COMMIT)
   rc =   SQLDisconnect(hdbc)
   rc =   SQLFreeConnect(hdbc)
   rc =   SQLFreeEnv(henv)
End Sub
```

In the above example, the "SQLAllocStmt", "SQLPrepare", "SQLBindParameter", "SQLExecute", and "SQLFreeStmt" statements are necessary to pass a parameter to a stored procedure. As can be seen, a lot of programming is required to describe the parameters passed to a stored procedure. This programming is inefficient and redundant. Thus, there is a need in the art for a more efficient method of invoking stored procedures with automated parameter checking.

SUMMARY OF THE INVENTION

To overcome the limitations in the prior art described above, and to overcome other limitations that will become apparent upon reading and understanding the present specification, the present invention discloses a method, apparatus, and article of manufacture for executing a stored procedure in a computer system. In accordance with the present invention, a stored procedure is invoked through a universal calling interface without first declaring the parameters. The computer retrieves parameter information, such as parameter type and address, for the stored procedure from a catalog, performs parameter checking for the parameters specified for the stored procedure using the retrieved parameter information, and then executes the stored procedure in the computer when the parameters match the retrieved parameter information. As a result, the present invention reduces the programming overhead involved in invoking a stored procedure.

BRIEF DESCRIPTION OF THE DRAWINGS

Referring now to the drawings in which like referenced numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

OVERVIEW

The stored procedure universal calling interface of the present invention comprises a method, apparatus, and article of manufacture for executing a stored procedure in the memory of a computer, without the need for pre-defining parameter information. The computer retrieves the necessary parameter information from a catalog and performs a parameter check for the parameters specified when the procedure is invoked or executed. If there is a parameter type mismatch, then the computer generates an error message. Otherwise, the computer executes the stored procedure. The parameter checking function may optionally be disabled.

HARDWARE ENVIRONMENT

Figure 1:
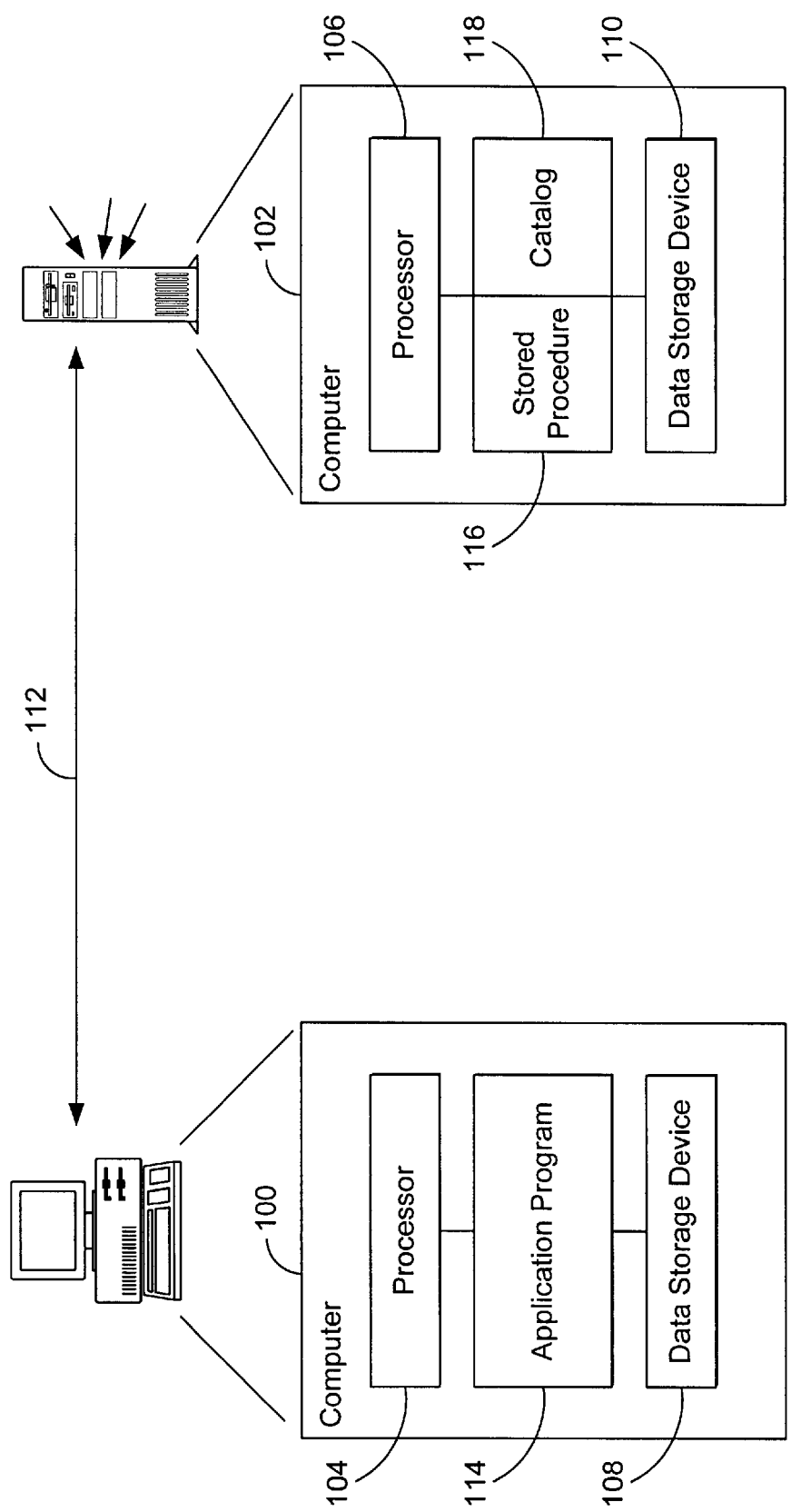
FIG. 1 is a block diagram illustrating an exemplary hardware environment used to implement the preferred embodiment of the invention.

FIG. 1 is a block diagram that illustrates an exemplary hardware environment of the present invention. The present invention is typically implemented in a client/server environment, wherein the client and server comprise interconnected computers 100 and 102. It is envisioned that each of the computers 100 and 102 are comprised of processors 104 and 106 and coupled data storage devices 108 and 110. In addition, the computers 100 and 102 may also include keyboards, displays, printers, etc. Although the computers 100 and 102 are preferably interconnected via a network 112, those skilled in the art will recognize that the present invention could be implemented on a single computer, or more than two computers, without departing from the scope of the claims attached hereto.

The present invention is preferably implemented using an application program 114, stored procedure 116 and catalog 118. Generally, the application program 114, stored procedure 116 and catalog 118 are tangibly embodied in a computer-readable medium, e.g. one or more of the fixed and/or removable data storage devices 108 and 110. The application program 114, stored procedure 116 and catalog 118 may be loaded from the data storage devices 108 and 110 into the memories of the computers 100 and 102 for execution. The application program 114, stored procedure 116 and catalog 118 all comprise instructions and data which, when read and executed by the computers 100 and 102, cause the computers 100 and 102 to perform the steps necessary to execute the steps or elements of the present invention.

STORED PROCEDURE PROGRAMMING FLOWCHART

Figure 2:
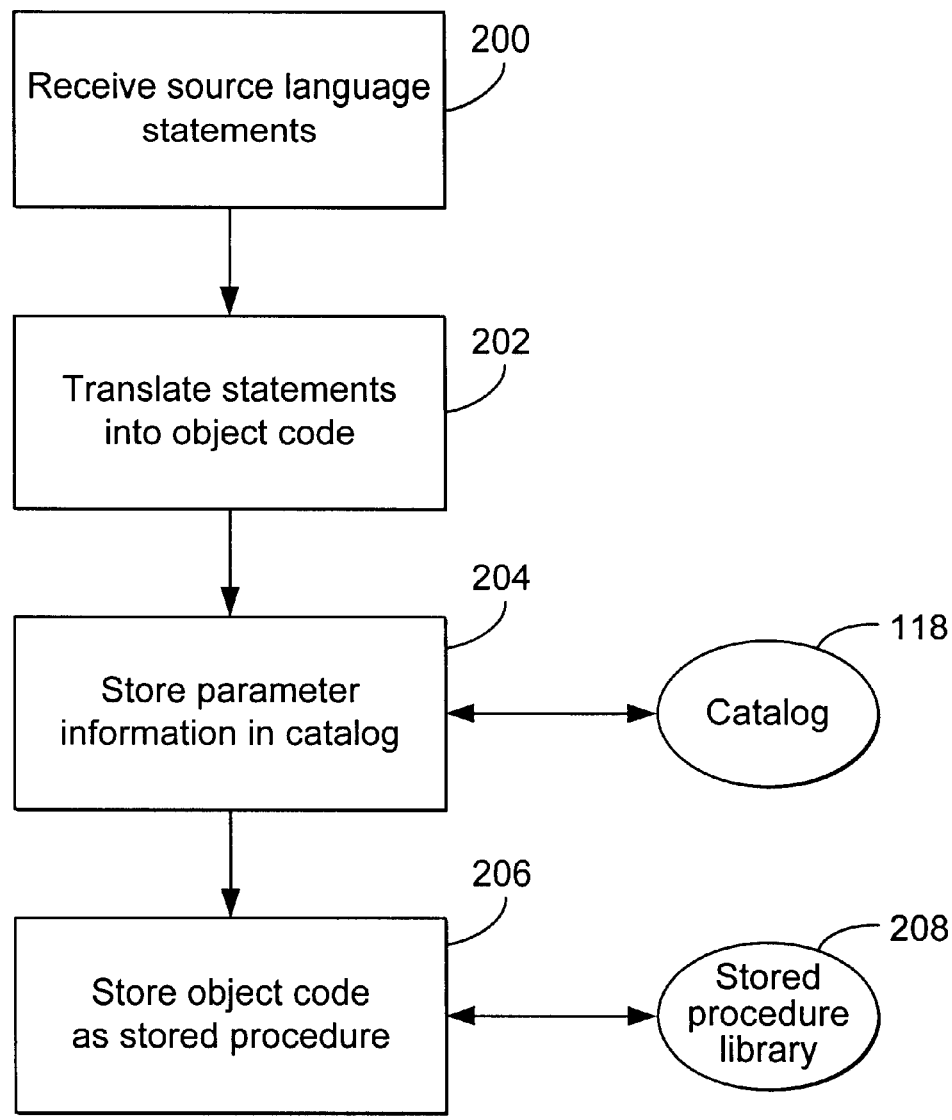
FIG. 2 is a flow diagram illustrating the steps performed by the computer to program the stored procedures.

FIG. 2 is a flowchart illustrating the steps necessary to program a stored procedure in the computer 102, via an interpreter or compiler, according to the present invention.

Block 200 represents the computer 102 receiving source language statements comprising a stored procedure 116 into the memory of the computer 102, wherein the statements typically comprise a sequence of SQL statements.

Block 202 represents the computer 102 translating the source language statements into object code or pseudo code in the memory of the computer 102.

Block 204 represents the computer 102 storing parameter information, such as stored procedure name, parameter types and addresses, derived from the source language statements in the catalog 118.

Block 206 represents the computer 102 storing the object code as a stored procedure 116 in a stored procedure library 208, wherein the stored procedure library 208 is located in the memory of the computer 102 or alternatively in one or more data storage devices 110.

STORED PROCEDURE EXECUTION FLOWCHART

Figure 3:
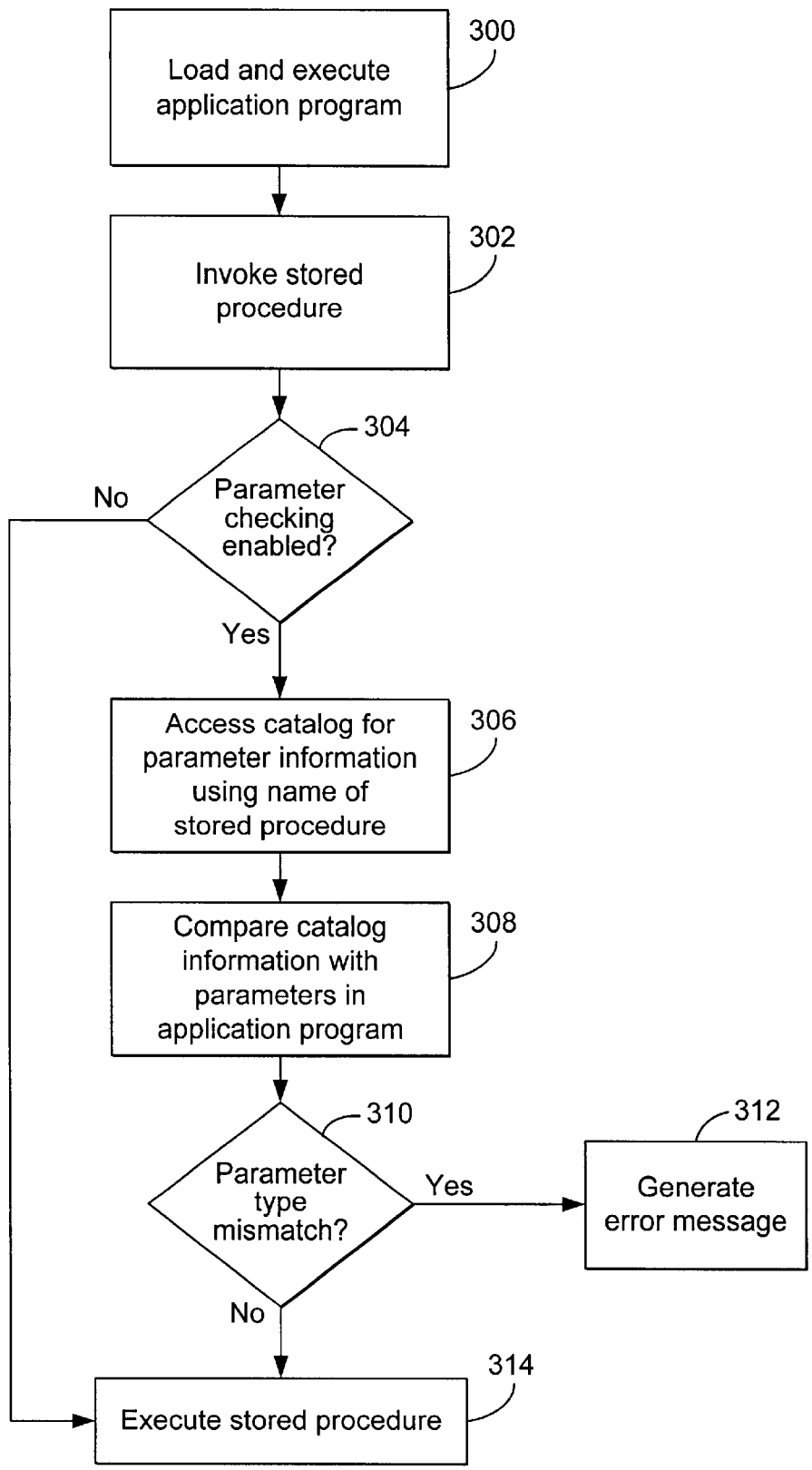
FIG. 3 is a flow diagram illustrating the steps performed in executing a stored procedure.

FIG. 3 illustrates the steps performed by the computers 100 and 102 in executing the application program 114 and stored procedure 116 according to the present invention.

Block 300 represents the computer 100 loading the application program 114 into its memory and executing the application program 114.

Block 302 represents the computer 102 invoking the stored procedure 116 in response to a message received from the application program 114 executed by the computer 100.

Block 304 is a decision block that represents the computer 102 determining whether parameter checking is enabled. If so, control transfers to Blocks 306–314; otherwise, control transfers to Block 314. Disabling the parameter checking provides performance benefits, but may result in errors during execution of the stored procedure 116, when there is a type mismatch that is not identified prior to the invocation of the stored procedure 116.

Block 306 represents the computer 102 accessing the catalog 118 for parameter information using the name of the stored procedure 116. The catalog 118 stores all the necessary information to be used by the stored procedure 116, including the name and location of the stored procedure 116.

Block 308 represents the computer 102 performing the parameter checking function by comparing the parameter information retrieved from the catalog 118 with the parameters passed to the stored procedure 116 by the application program 114.

Block 310 is a decision block that represents the computer 102 determining whether there is a parameter type mismatch. If so, control transfers to Block 312; otherwise, control transfers to Block 314.

Block 312 represents the computer 102 generating an error message in response to the parameter type mismatch.

Block 314 represents the computer 102 executing the stored procedure 116.

EXAMPLE

Following is an example of a VisualBasic program that could be used to implement the present invention:

```
dim d as double
dim s as string
dim obj as object
set obj = sp1.adapter   ' short hand to sp1 adapter
d = 0
s = "name"
obj.opendb      ' connect to the database
obj.call d, s   ' passing parameters
obj.closedb     ' disconnect from the database
text1.text = obj.param(0)   ' retrieve result for 'd'
text2.text = obj.param(1)   ' retrieve result for 's'
```

Note that 'sp1' is a VisualBasic program which implements the present invention using the Microsoft VisualBasic protocol. This protocol provides a graphical user interface (GUI) to help the user specify which server, userid, password, and stored procedure to invoke. In addition, it automatically checks the stored procedure catalog to retrieve the argument type information.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of executing a stored procedure in a server computer, comprising:
   (a) receiving a message from a client to execute the stored procedure in the server computer;
   (b) retrieving parameter information for the stored procedure into the server computer from a catalog managed by the server computer in response to the received message;
   (c) prior to execution of the stored procedure, comparing parameters being passed to the stored procedure with the parameter information retrieved from the catalog managed by the server computer; and
   (d) when the comparison indicates that the parameters passed to the stored procedure match the parameter information retrieved from the catalog managed by the server computer, executing the stored procedure in the server computer.

2. The method of claim 1, wherein the catalog stores the location of the stored procedure.

3. The method of claim 1, wherein the comparison is selectively enabled and disabled.

4. An apparatus for executing a stored procedures, comprising:
   (a) a server computer;
   (b) a universal calling interface, performed by the server computer, for:
      (1) receiving a message from a client computer to execute the stored procedure in the server computer;
      (2) retrieving parameter information for the stored procedure into the server computer from a catalog managed by the server computer in response to the received message;
      (3) prior to execution of the stored procedure, comparing parameters being passed to the stored procedure with the parameter information retrieved from the catalog managed by the server computer; and
      (4) when the comparison indicates that the parameters passed to the stored procedure match the parameter information retrieved from the catalog managed by the server computer, executing the stored procedure in the server computer.

5. The apparatus of claim 4, wherein the catalog stores the location of the stored procedure.

6. The apparatus of claim 4, wherein the means for comparison is selectively enabled and disabled.

7. An article of manufacture for use in executing a stored procedure in a server computer, the article of manufacture comprising a computer-readable storage medium having a computer program embedded therein that causes the server computer to perform the steps of:
   (a) receiving a message from a client computer to execute the stored procedure in the server computer;
   (b) retrieving parameter information for the stored procedure into the server computer from a catalog managed by the server computer in response to the received message;
   (c) prior to execution of the stored procedure, comparing parameters being passed to the stored procedure with the parameter information retrieved from the catalog managed by the server computer; and
   (d) when the comparison indicates that the parameters passed to the stored procedure match the parameter information retrieved from the catalog managed by the server computer, executing the stored procedure in the server computer.

8. The article of manufacture of claim 7, wherein the catalog stores the location of the stored procedure.

9. The article of manufacture of claim 7, wherein the comparison is selectively enabled and disabled.

* * * * *